Dec. 6, 1938.  G. LARSEN  2,139,084
FOUNTAIN PEN
Filed April 5, 1935  2 Sheets-Sheet 1
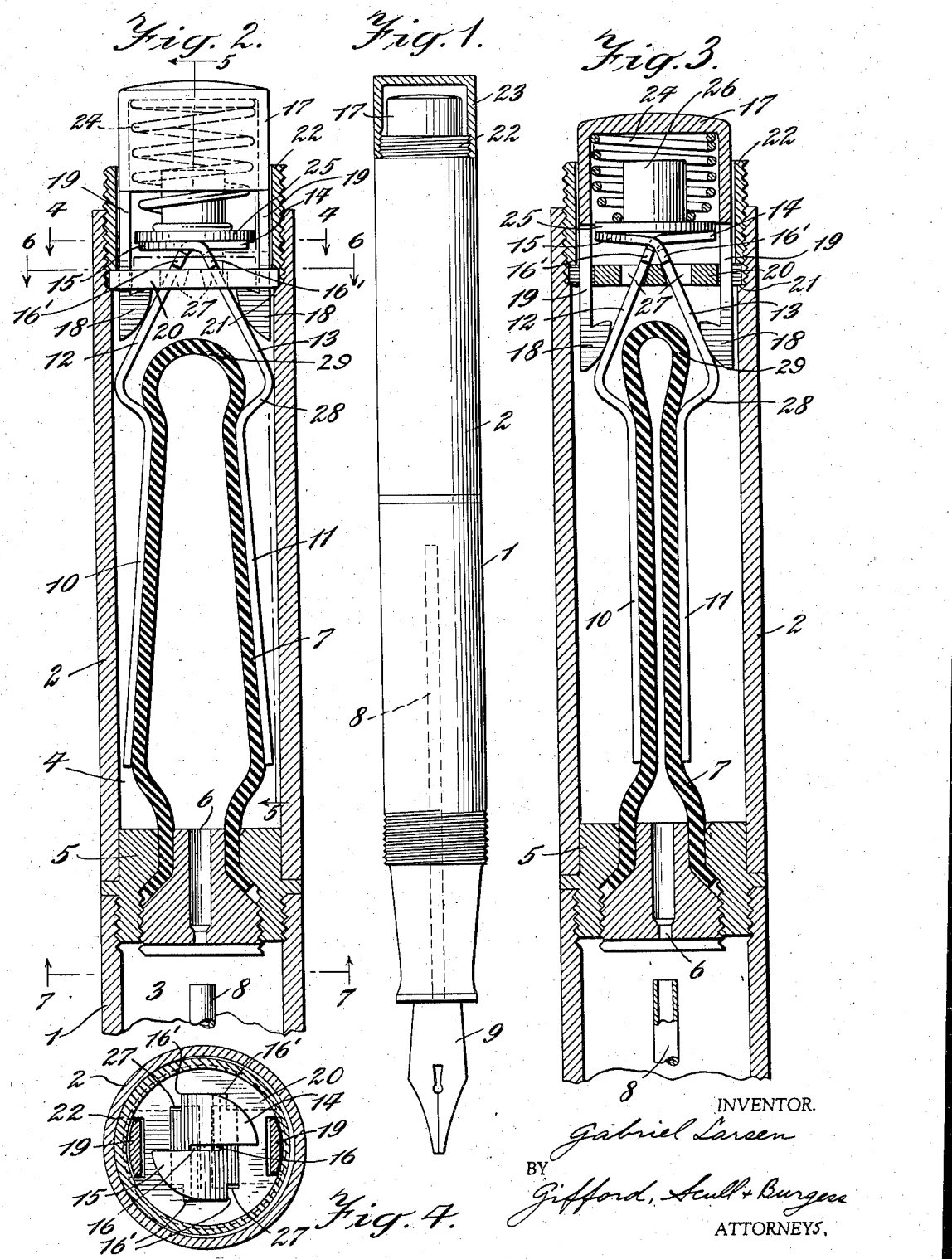

Dec. 6, 1938.  G. LARSEN  2,139,084
FOUNTAIN PEN
Filed April 5, 1935  2 Sheets-Sheet 2
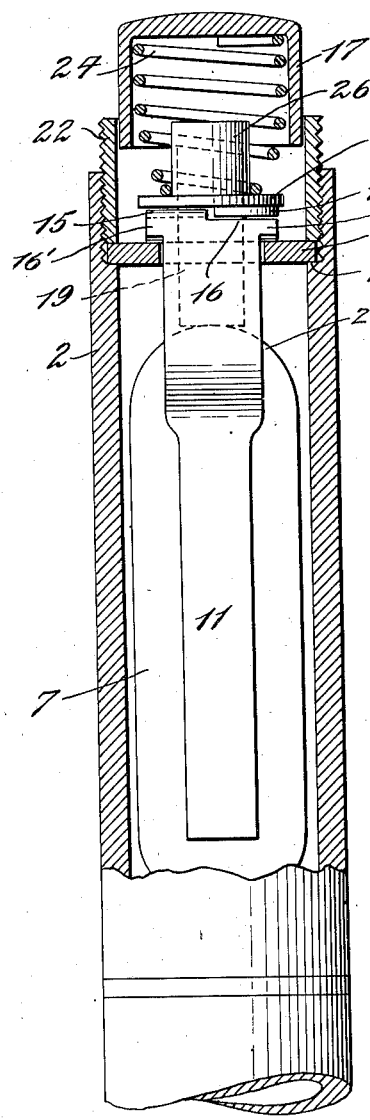
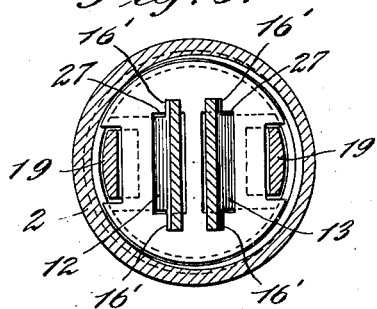
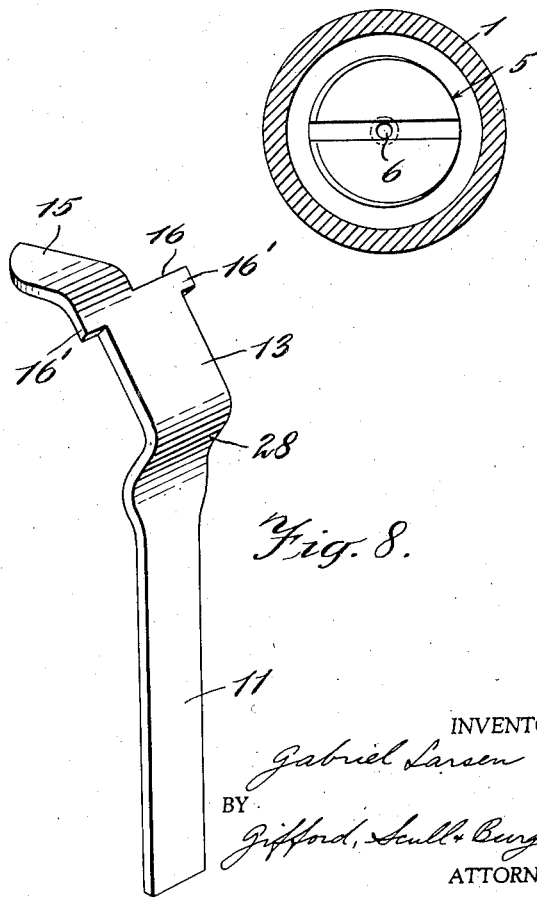
INVENTOR.
Gabriel Larsen
BY
Gifford, Scull & Burgess
ATTORNEYS.

Patented Dec. 6, 1938

2,139,084

UNITED STATES PATENT OFFICE 2,139,084

FOUNTAIN PEN

Gabriel Larsen, Springfield, N. J., assignor to L. E. Waterman Company, New York, N. Y., a corporation of New York Application April 5, 1935, Serial No. 14,779

14 Claims. (Cl. 120—46)

This invention relates to a novel and improved form of fountain pen, the novel features of which will be best understood from the following description and the annexed drawings, in which I have shown a selected embodiment of the invention and in which:

Fig. 1 is a longitudinal view of a pen having the invention applied thereto, this view being mostly in elevation but parts being shown in section;

Fig. 2 is a vertical section through the upper part of the pen shown in Fig. 1, certain elements being shown in elevation;

Fig. 3 is a view similar to Fig. 2 but showing certain parts in different positions and showing in section some of the parts appearing in elevation in Fig. 2;

Fig. 4 is a section approximately on the line 4—4 of Fig. 2;
Fig. 5 is a view approximately on the line 5—5 of Fig. 2;

Fig. 6 is a section approximately on the line 6—6 of Fig. 2;

Fig. 7 is a section approximately on the line 7—7 of Fig. 2;

Fig. 8 is a view of one of the bars appearing in the other figures.

The invention relates to the type of pen shown, for example, in the patent to Taylor 802,668, granted October 24, 1905, although certain features of the invention may be employed with other types of pen where found suitable.

I shall describe the invention as if the pen were arranged vertically with its point at the lower end, although it is to be understood that that arrangement is merely for the purpose of convenience in referring to the relations between the various parts.

The pen in the illustrated embodiment is shown as comprising a barrel having two sections 1 and 2, the section 1 having therein a chamber forming an ink reservoir 3, and the other forming a pump chamber 4. The two chambers may be separated by a plug designated generally by the numeral 5, the details of which are more fully described and claimed in the copending application of Gabriel Larsen and Henry N. Briechle, Ser. No. 15,044, filed April 6, 1935. For the present application, it is sufficient to say that this plug has an opening 6 therethrough forming a communication between the two chambers and that it supports a collapsible sac of rubber or other suitable material and designated 7. This sac extends longitudinally of the barrel in a manner well known in the art, and alternate collapsing and expansion thereof serves to pump ink into the reservoir 3. To aid the pumping action, a vent tube 8 extends longitudinally of the barrel to a location beneath the pen point 9.

In order to cause collapsing and expansion of the sac, I provide an actuating mechanism in the form of oppositely disposed bars 10 and 11, each disposed between the sac and an adjacent wall of the barrel. Each of these bars extends beyond the end of the sac and is there provided with a portion 12 and 13, respectively, each of which is inclined longitudinally of the barrel and terminates in a transversely extending head 14 or 15. Each head is offset from the body of the bar, as will be seen from Figs. 5, 6, and 8, and each bar also has a bearing portion 16 adapted to engage beneath the head of the other bar.

The bars 10 and 11 may be actuated to press the sac 7 by means of a thumb-piece 17 movable lengthwise of the barrel and slidably supported therein. In the present embodiment, this thumb-piece is shown as extending beyond the end of the section 2 of the barrel so that it may be readily operated by the thumb of a user's hand when that hand is grasping the barrel with the fingers. The thumb-piece is provided with members 18 in the form of cams contacting with the portions 12 and 13 of the bars and provided with shanks 19 connected to the thumb-piece and extending through slots in a disk 20 engaging a shoulder 21 of the barrel and held thereagainst as by a threaded ring 22, engaging the end of the barrel, as plainly indicated. Incidentally, this ring 22 is shown as extending beyond the end of the barrel to receive a threaded cap 23, as shown in Fig. 1.

The bars are moved inwardly towards the sac by movement of the thumb-piece downwardly, as viewed in the drawings, to the position shown in Fig. 3, and then the thumb-piece is moved back to its normal position shown in Fig. 2 by means of a compression spring 24 received within the thumb-piece and acting against a bearing member 25 engaging the two heads 14 and 15. This bearing member may have a shank 26 extending coaxially of the shaft.

In operation, when the thumb-piece is moved downwardly from the position shown in Fig. 2 to that shown in Fig. 3, the bars 10 and 11 are moved from their positions adjacent the opposite walls of the barrel to some such position as shown in Fig. 3, where they compress the sac. In the normal position shown in Fig. 2, the two heads 14 and 15 of the bars are substantially in the same plane and in contact with the bearing member 25. As the thumb-piece is pushed downwardly, however, to some such position as shown in Fig. 3, and the bars 10 and 11 moved inwardly, these bars rock about their bearing portions 16, each bar rocking on the bearing portion 16 of the other bar, and the heads occupy some such position as shown in Fig. 3. At the same time, the spring 24 is compressed, as will be obvious.

This compression of the spring 24 tends to cause each bar to rock on the bearing portion 16 of the other bar and thus return to the position shown in Fig. 2. Such rocking is prevented by the action of the members 18, which are in engagement with the inclined portions 12 and 13 of the bars. However, the spring remains charged, and as soon as downward pressure on the thumb-piece is released, so that it may return to its normal position shown in Fig. 2, the action of the spring will be felt and will cause the rocking of the bars on the bearing portion 16, to cause the bars to return to the position shown in Fig. 2, as the thumb-piece moves upwardly.

The spring 24, even in the position shown in Fig. 2, has sufficient compression to force the bars outwardly when permitted by the members 18. Accordingly, movement of the thumb-piece with the members 18 lengthwise of the barrel results in movement of the bars 10 and 11, first from the position shown in Fig. 2 to that shown in Fig. 3 and then back to the position shown in Fig. 2.

The bars will be held in position longitudinally of the barrel by the action of the spring and also by the engagement of the shoulders 16′ thereon with the disk 20, which has openings 27 through which the bars pass, and which openings are of such size and shape that these shoulders of the bars will not pass therethrough, particularly when the two bars are in position.

As best shown in Figs. 2 and 3, each bar has its body portion, which engages with the sac, connected to its inclined portion by means of a reverse bend 28, so that the inclined portion 12 or 13, as the case may be, is spaced outwardly from the end 29 of the sac when the sac is full. At the same time, the body portion of each bar is so disposed with relation to the other parts of the bar that when the sac is full, as in Fig. 2, the body portions of the bars will be arranged between the sac and the adjacent walls of the barrel without exerting any substantial pressure on the sac, thereby permitting the sac to attain substantially its full capacity. At the same time, when the sac is collapsed to some such position as shown in Fig. 3, the bars are substantially parallel to each other so as to expel substantially all the air from the sac.

While I have shown the invention as embodied in a specific form, it is to be understood that various changes in details may be made without departing from the scope of the invention, as defined by the appended claims.

I claim:

1. In a fountain pen, a barrel having a collapsible sac therein and extending longitudinally thereof, a bar disposed between said sac and a wall of the barrel and having a head disposed beyond the end of the sac and extending transversely of the barrel, a thumb-piece slidably mounted on said barrel for movement lengthwise thereof, a bearing member adapted to engage said head of the bar and moved lengthwise of the barrel by movement of the thumb-piece in one direction, said bar being pivoted adjacent said head, whereby engagement of said head by said bearing member will cause the bar to rock on its pivot transversely of the barrel, a spring acting between said thumb-piece and bearing member to urge the member against said head, means on the side of the sac opposite said bar and adapted to co-operate therewith to compress the sac therebetween, and means operated by said thumb-piece to rock said bar to compress the sac.

2. In a fountain pen, a barrel having a collapsible sac therein and extending longitudinally thereof, a bar disposed between said sac and a wall of the barrel and having a head disposed beyond the end of the sac and extending transversely of the barrel, a thumb-piece slidably mounted on said barrel for movement lengthwise thereof, a bearing member adapted to engage said head of the bar and moved lengthwise of the barrel by movement of the thumb-piece in one direction, said bar being pivoted adjacent said head, whereby engagement of said head by said bearing member will cause the bar to rock on its pivot transversely of the barrel, a spring acting between said thumb-piece and bearing member to urge the member against said head, means on the side of the sac opposite said bar and adapted to co-operate therewith to compress the sac therebetween, and a member connected to said thumb-piece and adapted to engage said bar to rock it on its pivot against the action of said spring to compress said sac.

3. In a fountain pen, a barrel having a collapsible sac therein and extending longitudinally thereof, two bars disposed on opposite sides of said sac and between said sac and the adjacent walls of the barrel and having rocking bearings adjacent the end of the sac, a thumb-piece slidably mounted on said barrel for movement lengthwise thereof, means actuated by such movement of the thumb-piece to press said bars against the sac, and a spring acting against both of said bars and tending to move them away from the sac.

4. In a fountain pen, a barrel having a collapsible sac therein and extending longitudinally thereof, two bars disposed on opposite sides of said sac and between said sac and the adjacent walls of the barrel and having rocking bearings adjacent the end of the sac, each of said bars having a surface inclined longitudinaly of the barrel, a thumb-piece slidably mounted on said barrel beyond the sac for movement longitudinally of the barrel, members connected to said thumb-piece and adapted to engage said surfaces during movement of the thumb-piece in one direction to press said bar against the sac, and a spring acting against said movement of the thumb-piece and tending to return the thumb-piece to normal position and to move said bars away from said sac.

5. In a fountain pen, a barrel having a collapsible sac therein and extending longitudinally thereof, two bars disposed on opposite sides of said sac and between said sac and the adjacent walls of the barrel, each of said bars having a head disposed beyond the end of the sac and extending transversely of the barrel in opposite directions, a rocking bearing for each of said bars adjacent said heads, a bearing member contacting with both of said heads on the side thereof opposite the sac, a thumb-piece slidably mounted in the barrel for movement longitudinally thereof and disposed beyond said bearing member, a spring acting between said thumb-piece and bearing member and normally urging them apart, and members connected to said thumb-piece and adapted to engage said bars to force them towards the sac against the action of said spring, movement of the thumb-piece to thus force the bars towards the sac causing charging of the spring to tend to urge the bars away from the sac.

6. In a fountain pen, a barrel having a collapsible sac therein and extending longitudinally thereof, two bars disposed on opposite sides of said sac and between said sac and the adjacent walls of the barrel, each of said bars having a head disposed beyond the end of the sac and extending transversely of the barrel in opposite directions, a rocking bearing for each of said bars adjacent said heads, a bearing member contacting with both of said heads on the side thereof opposite the sac, a thumb-piece slidably mounted in the barrel for movement longitudinally thereof and disposed beyond said bearing member, a spring acting between said thumb-piece and bearing member and normally urging them apart, members connected to said thumb-piece and adapted to engage said bars to force them towards the sac against the action of said spring, movement of the thumb-piece to thus force the bars towards the sac causing charging of the spring to tend to urge the bars away from the sac, and a plate extending transversely of the barrel between the end of the sac and the heads of the bars and having openings therein through which extend the bars and parts of said members, said parts being reduced and having enlarged ends incapable of passing through the member openings in said plate.

7. In a fountain pen, a barrel having a collapsible sac therein and extending longitudinally thereof, two bars disposed on opposite sides of said sac and between said sac and the adjacent walls of the barrel, each of said bars having a head extending transversely of the barrel and towards the opposite side of the barrel from the bar, each of said heads being offset from the center of the bar and each bar having a bearing beneath the head of the other bar, a bearing member adapted to contact with both of said heads, and means to actuate said bearing member to cause said bars to rock upon their bearings.

8. In a fountain pen, a barrel having a collapsible sac therein and extending longitudinally thereof, two bars disposed on opposite sides of said sac and between said sac and the adjacent walls of the barrel, each of said bars having a transversely extending head beyond the end of the sac and having a rocking bearing adjacent said end of the sac and movable lengthwise of the barrel, a bearing member engaging said heads, a thumb piece movable lengthwise of said barrel and having means to rock said bars simultaneously on said bearings, and a spring between said thumb piece and bearing member and compressed by movement of said thumb piece to thus actuate said bars, said spring tending to return said thumb piece to initial position and to cause said bearing member to rock said bars on said bearings to likewise return said bars to initial position.

9. In a fountain pen, a barrel having a collapsible sac therein and extending longitudinally thereof, two bars disposed on opposite sides of said sac and between said sac and the adjacent walls of the barrel, each of said bars extending beyond the end of the sac and provided with a transversely extending head and a rocking bearing engaging the other bar, a thumb piece movable lengthwise of the barrel and having means to rock said bars on said bearings to collapse the sac, a spring disposed between said thumb piece and said heads and resisting said collapsing movement of the bars, and returning said thumb piece and bars to initial position upon release of pressure upon said thumb piece.

10. In a fountain pen, a barrel having a collapsible sac therein and extending longitudinally thereof, a bar disposed between said sac and a longitudinal wall of the barrel and having a head disposed beyond the end of the sac and extending transversely of the barrel, a thumb-piece slidably mounted on said barrel for movement lengthwise thereof, a bearing member adapted to engage said head of the bar and moved lengthwise of the barrel by movement of the thumb-piece in one direction, a spring adapted to move said thumb-piece in said direction, said bar being pivoted adjacent said head, whereby said movement of said thumb-piece in said direction will cause the bar to rock on its pivot transversely of the barrel in one direction, means on the side of the sac opposite said bar and adapted to cooperate therewith to compress the sac therebetween, and means connected to said thumb-piece to move the lever in its opposite direction upon movement of the thumb-piece in its opposite direction to compress said sac.

11. In a fountain pen having a barrel and a sac therein with one end of said sac closed, a relatively rigid bar having a body portion engaging one side of the sac and being bent outwardly towards the barrel wall adjacent the closed end of the sac, and then inwardly past said closed end, thus forming an inclined portion joined to the body portion but spaced from the sac, means on the side of the sac opposite said body portion and adapted to cooperate therewith to compress the sac therebetween, and means to move said body portion of bar towards the sac to collapse it and away from the sac to permit the sac to expand.

12. In a fountain pen having a barrel and a sac therein with one end of said sac closed, two relatively rigid bars disposed on opposite sides of said sac and between said sac and the adjacent walls of the barrel, said bars having body portions engaging opposite sides of the sac and bent outwardly towards the opposite walls of the barrel adjacent the closed end of the sac and then inwardly past said closed end, thus forming inclined portions joined to the body portion but spaced from the sac, means to move said bars towards each other to collapse the sac, whereby upon said collapsing the space between said bars adjacent the closed end of the sac will receive said end of the sac without pinching thereof.

13. In a fountain pen having a barrel and a sac therein with one end of said sac closed, two relatively rigid bars disposed on opposite sides of said sac and between said sac and the adjacent walls of the barrel, said bars having body portions engaging opposite sides of the sac and bent outwardly towards the opposite walls of the barrel adjacent the closed end of the sac and then inwardly past said closed end, thus forming inclined portions joined to the body portion but spaced from the sac, a thumb piece movable lengthwise of the barrel and having members connected thereto and adapted respectively to contact with said inclined portions on said bars, a spring urging said thumb piece away from said inclined portions of the bars, and bearings for said bars beyond said closed end of the sac and upon which said bars may rock during said movements of the thumb-piece.

14. In a fountain pen having a barrel and a sac therein with one end of said sac closed, two relatively rigid bars disposed on opposite sides of said sac and between said sac and the adjacent walls of the barrel, said bars having body portions engaging opposite sides of the sac and bent outwardly towards the opposite walls of the barrel adjacent the closed end of the sac and then inwardly past said closed end, thus forming inclined portions joined to the body portion but spaced from the sac, means to move said bars towards each other to collapse the sac, whereby upon said collapsing the space between said bars adjacent the closed end of the sac will receive said end of the sac without pinching thereof, the ends of said bars which are remote from the closed end of the sac being spaced further apart than the portions of the bars adjacent said closed end when the sac is expanded, but said body portions being substantially parallel to each other when the sac is collapsed.

GABRIEL LARSEN.